United States Patent [19]

McLaren

[11] 4,212,620
[45] Jul. 15, 1980

[54] TUBE EXTRUSION DIE

[75] Inventor: John W. McLaren, Beaverton, Mich.

[73] Assignee: The Dow Chemical Company, Midland, Mich.

[21] Appl. No.: 921,683

[22] Filed: Jul. 3, 1978

[51] Int. Cl.² ............................................. B29F 4/03
[52] U.S. Cl. .................................. 425/381; 264/209; 425/466; 425/467
[58] Field of Search ................. 425/381, 465–467; 264/95, 209

[56] References Cited

U.S. PATENT DOCUMENTS

| | | | |
|---|---|---|---|
| 2,793,598 | 5/1957 | Rivoche | 425/465 |
| 2,805,446 | 9/1957 | Bartoo | 425/466 |
| 3,267,519 | 8/1966 | Albert | 425/466 |
| 3,461,501 | 8/1969 | Stewart | 425/466 |
| 3,702,751 | 11/1972 | Mehnert | 425/466 |
| 3,807,916 | 4/1974 | Ramsey | 425/381 |
| 3,914,085 | 10/1975 | Kruelskie | 425/466 |

Primary Examiner—Jeffery R. Thurlow
Attorney, Agent, or Firm—R. B. Ingraham

[57] ABSTRACT

A readily adjustable tubing extrusion die has a laterally movable die ring which is clamped to the die body and slideable by means of positive positioning devices.

6 Claims, 6 Drawing Figures

TUBE EXTRUSION DIE

In the extrusion of extrudeable material such as thermoplastic resins into tubes and like hollow forms, it is oftentimes desirable to adjust the die opening to provide a product having a desirably uniform or non-uniform wall thickness. Frequently this has been accomplished by localized bending of the external die lips and oftentimes it has been accomplished by loosening the bolts or other clamping means holding the external die ring having the external die lips moving the die ring in the desired direction and reclamping. On some extruders this can be adjusted and need not be readjusted over long periods of time. In some instances, particularly where the feed material may be changed frequently, initial adjustment of the die may require extended periods of time, for example, up to 24 hours and require several hundred pounds of material.

It would be desirable if there were available an improved tubing extrusion die which would permit ready and rapid positioning of the outer die ring relative to the mandrel thereof. It would also be desirable if there were available an adjustable tubing extrusion die which could be adjusted with a high degree of accuracy and resettability.

It would also be desirable if such a tubing die were of simple construction.

These benefits and other advantages in accordance with the present invention are achieved in a tubing extrusion die, the die having a die body, a mandrel, the die ring, the die ring in combination with the mandrel, and a die body defining a generally annular extrusion passageway, the annular extrusion passageway connecting with a material inlet disposed at a first end of the die, the annular passageway terminating at a discharge or second end of the die in an annular extrusion orifice, the improvement which comprises slideably affixing the die ring to the die body by means of a die ring clamp, the die ring clamp being rigidly affixed to the die body and means to positively displace the die ring relative to the mandrel in a plane generally perpendicular to a longitudinal axis of the annular passage and the means to displace the die ring being capable of displacing the die ring in at least two directions in a plane normal to the axis of the annular passageway.

Further features and advantages of the present invention will become more apparent from the following specifications taken in connection with the drawing wherein.

Figure 1:
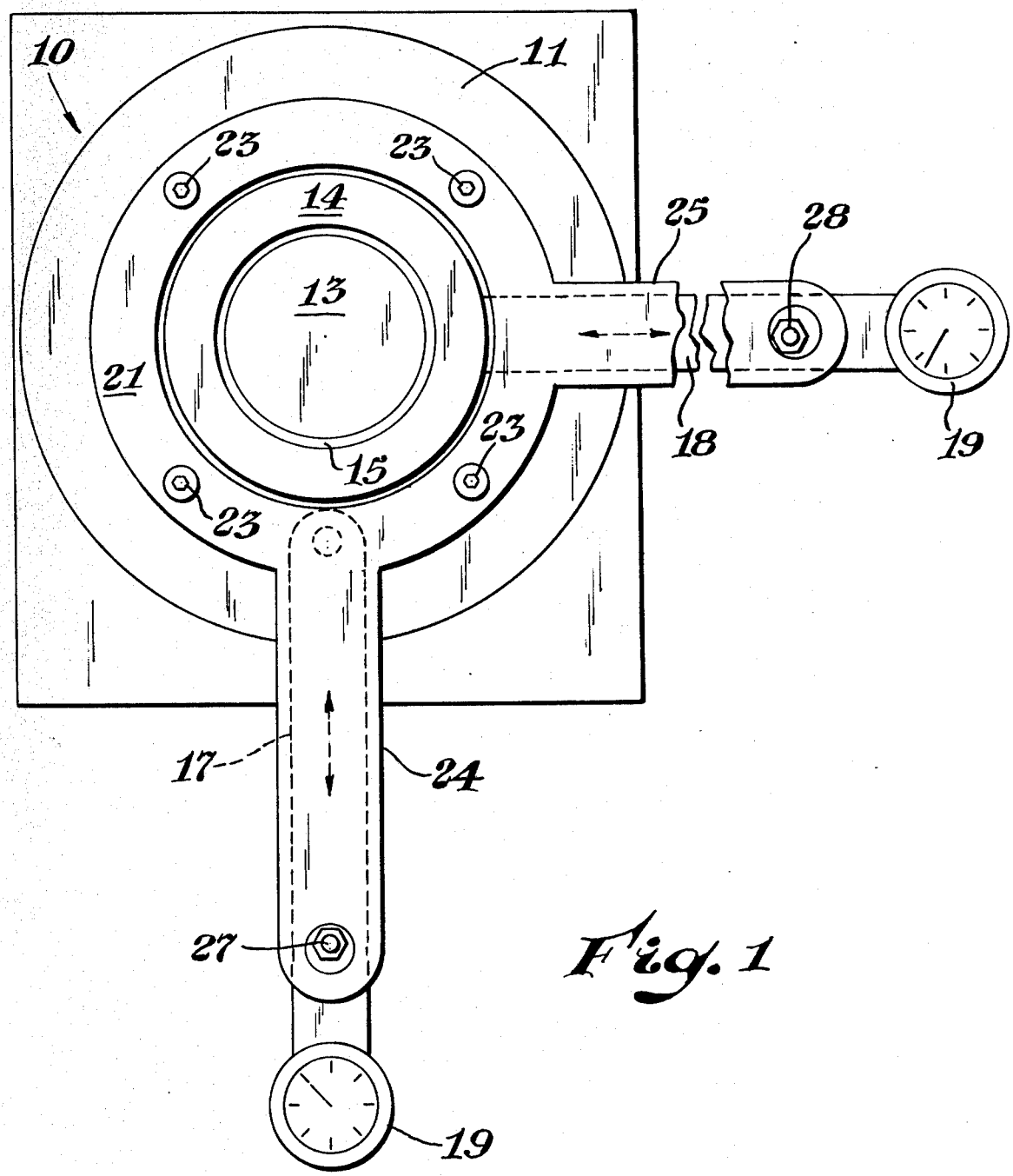
FIG. 1 is an extrusion end view of a die in accordance with the invention affixed to an extruder.

In FIG. 1 there is schematically depicted a die in accordance with the invention, generally designated by the reference numeral 10. The die 10 comprises a die body 11 which has supported therein a mandrel 13 rigidly supported therein. The die is viewed from the extrusion and discharge end. A die ring 14 is disposed about the terminal portion of the mandrel 13 and defines therebetween an extrusion orifice 15 of a generally circular cross-section. The passageway 15 is in full communication with the polymer inlet passageway not shown.

The die ring 14 has a first arm 17 and a second arm 18. One of the arms is pivotally affixed to the die ring 14. Each of the arms 17 and 18 have affixed thereto a distance-indicating means 19 or a dial gauge, as depicted in FIG. 1. A die ring clamp ring 21 surrounds the central portion of the die ring 14 and clamps the die ring to the die body 11. The die ring clamp ring 21 is rigidly affixed to the die body 11 by means of bolts 23, which pass through the die ring clamp ring 21 into the body 11 and do not contact the die ring 14. The die ring clamp ring 21 has a first arm 24 and a second arm 25 which parallel the arms 17 and 18 respectively of the die ring 14. A partially eccentric shoulder bolt 27 passes through arms 17 and 24 and a similar partially eccentric shoulder bolt 28 passes through arms 18 and 25. By rotation of either of the shoulder bolts 27 or 28, the arms 17 and 24 or arms 18 and 25 are caused to move relative to one another in the directions indicated by the double-headed arrows. As the arms 17 and 18 are affixed to die ring 14, rotation of the partially eccentric bolts 27 and 28 will vary the dimensions of opening 15 at various locations about the annular passage, thus die ring 14 may be centered about the axes of mandrel 13 or the center of the die ring 14 may be displaced from the axes in any radial direction.

Figure 2:
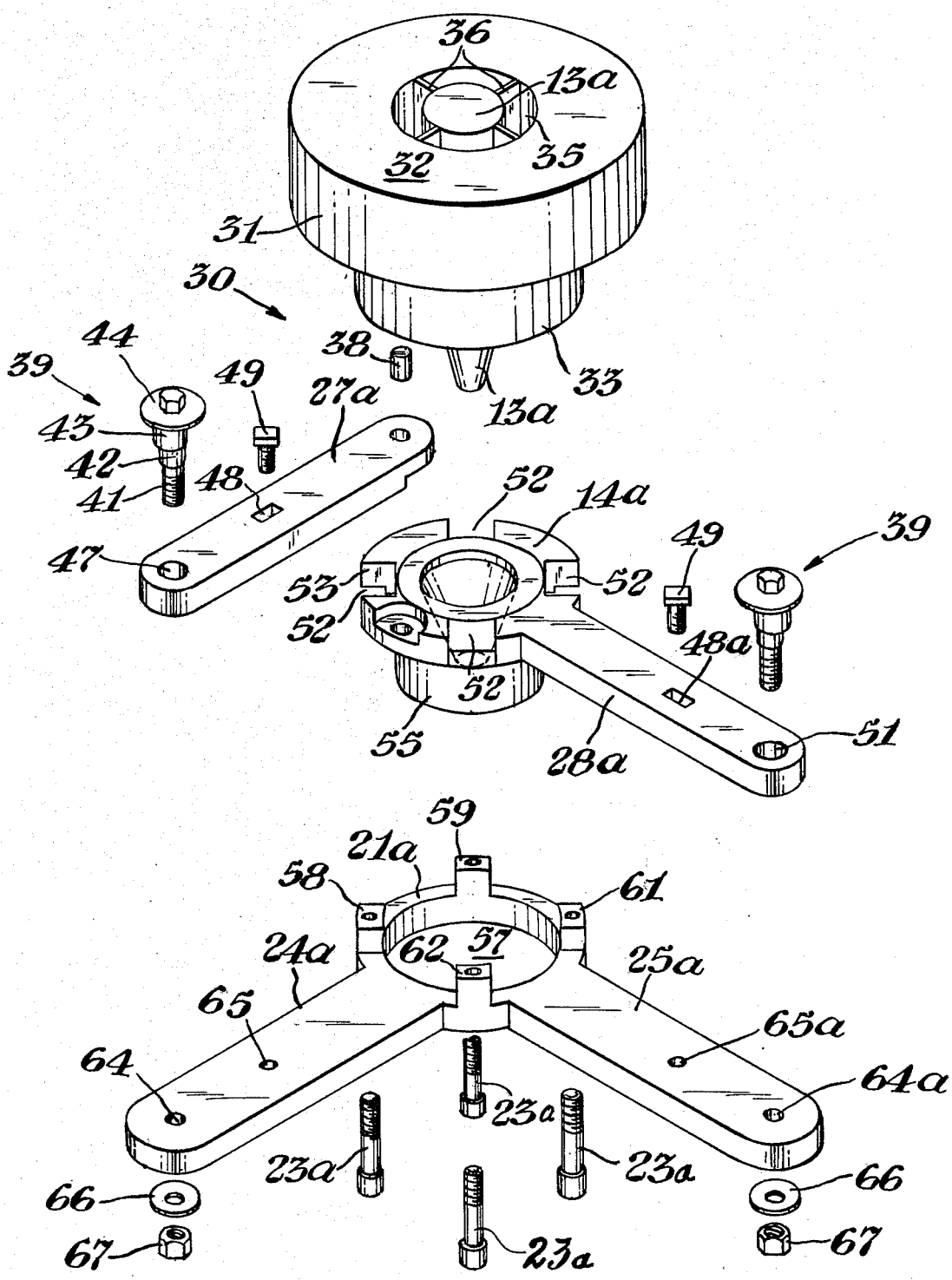
FIG. 2 is an exploded view of a second embodiment of a die in accordance with the present invention.

FIG. 2 depicts an exploded view of the die in accordance with the present invention, generally designated by the reference numeral 30. The die 30 has a die body 31 having a first, or inlet end 32, and a second, or outlet end 33. The mandrel 13a is disposed within the body 31. The mandrel 13a and the die 32 define a generally annular passage 35 passing entirely through the die body. The mandrel 13a is supported by a plurality of webs designated 36 which form a so-called "spider". Die ring 14a is disposed adjacent the second end 33 of the die body 31 and is generally concentrically disposed over the terminal portion of mandrel 13a at the second end 33 of the die body 31. The die ring 14a has a first fixed arm 28a and a second, or pivotally attached arm 27a. The arm 27a is affixed to the die ring 14a by means of closely fitting dowel pin 38. A partly eccentric bolt 39 passes through a terminal end of the arm at 27a remote from the die ring 14a. The bolt 39 has a threaded axial portion 41, a shoulder bearing axial portion 42 and an eccentric bearing portion or cam 43 and a flanged head is adjacent the eccentric bearing portion 43. The eccentric bearing portion 43 is a tight sliding fit in opening 47 defined by arm 27a. The arm 27a defines an intermediate opening 48 adapted to receive bolt 49. The arm 28a defines a terminal opening 51 remote from the die ring 14a adapted to receive a second partially eccentric bolt 39. The die ring 14a defines a generally radially extending flange 53. Within the flange 53 are defined a plurality of peripherally disposed slots 52, spaced about 90° from adjacent slots 52. The die ring 14a has a generally cylindrical portion 55 extending axially outwardly and away from the flange 53 and the second end 33 of the die body 31. A die ring clamp ring 21a defines a generally centrally disposed opening 57 adapted to receive portion 55 of the die ring 14a. The die ring clamp ring 21a defines four bosses 58, 59, 61 and 62 adapted to fit loosely within the slots 52 of the flange 53 of die ring 14a. Each of the bosses 58, 59, 61 and 62 define a generally axially extending bolt passageway. Four clamp ring bolts 23a pass through the openings in the bosses and rigidly affix the die ring clamp ring 21a to the second end 33 of the die body 31. The bosses are of the appropriate height that the die ring 14a can be moved in the directions of arms 27a and 28a, which are disposed in a plane normal to the axes of mandrel 13a. The die ring clamp ring 21a has two rigidly affixed arms 24a and 25a which correspond to the position to the arms 27a and 28a respectively of die ring 14a. The arm 24a defines an opening 64 into which the portion 42 of bolt 49 rotatably fits. The arm 24a defines an intermediate opening 65 into which bolt 49 fits and threadably engages the arm 24a. A similar opening 65a is defined by arm 25a into which a portion of bolt 49 threadably fits. Bolts 39 carry a Belleville or cone-spring washer 66 and a nut 67.

Rotation of the partially eccentric bolt 39 carrying cam 43 in opening 47 of arm 27a and opening 64 of arm 24a causes motion of arm 27a generally in the direction of the longitudinal axis of arm 24a, thus positioning the die ring 14a generally along the longitudinal axis of arm 24a. Rotation of the partially eccentric bolt 39 passing through arms 28a and 25a causes motion of the die ring generally along a line corresponding to a longitudinal center line of arm 25a. The bolts 49 conveniently are employed to clamp arms 27a and 24a together and arms 28a and 25a together when the desired adjustment of die ring 14a has been obtained. Beneficially, the flange 53 of the die ring 14a fits within the space between the die ring clamp ring 21a and second end 33 of the die 31 in such a manner that minor sliding motion is possible but no significant leakage is observed between the die ring 14a and the die body 31. Advantageously, adjacent surfaces of the die ring 14a and the die ring clamp ring 21a are lubricated with a material such as molybdenum disulfide. The re-settability of the die in accordance with the invention such as illustrated in FIGS. 1 and 2 is dependent upon the precise fit of surfaces which hold the dowel 38, the cam 43 and portion 42 of bolt 39. The closer the fit, the less backlash and, if properly fitted, generally adjustments do not require approaching a pre-determined point from the same direction of rotation. Usually die adjustments are made in a period of about 15 minutes to obtain satisfactory operation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a tubing extrusion die, the die having a die body, a mandrel, a die ring, the die ring in combination with the mandrel and the die body defining a generally annular extrusion passageway, the annular extrusion passageway connecting with a material inlet disposed at a first end of the die, the annular passageway terminating at a discharge or second end of the die in an annular extrusion orifice, the improvement which comprises slideably affixing the die ring to the die body, the die ring having at least two arms extending in a plane which is generally normal to the axis of the annular passageway, each said arm having a terminal end remote from the die ring which is fitted to a means to positively displace the die ring, the die body having at least two arms fixed thereto and extending generally parallel to the arms of the die ring to form at least two pairs of generally parallel arms, each said arm fixed to the die body being fitted to the means to positively displace the die ring, whereby upon adjustment of the means to positively displace the die ring, the arms of each pair of arms move relative to each other to position the die ring relative to the mandrel.

2. The die of claim 1 wherein the means to positively displace the die ring comprises at least two cams.

3. The die of claim 1 wherein the die ring has a pair of arms angularly disposed at about 90° to each other.

4. The die of claim 1 wherein one of the die ring arms is pivotally attached to the die ring.

5. The die of claim 1 including a die ring clamp ring affixed to the die body which slideably positions the die ring against the die body.

6. A tube extrusion die, the die having a die body, a mandrel, a die ring, the die ring in combination with the mandrel and the die body defining a generally annular extrusion passageway, the annular extrusion passageway connecting with a material inlet disposed at the first end of the die, the annular passageway terminating at a discharge or second end of the die in an annular extrusion orifice, the improvement which comprises: the die ring having a pair of arms angularly disposed at about 90° to each other, one of the arms being pivotally affixed to the die ring, the arms extending in a plane which is generally normal to the axis of the annular passageway, a die ring clamp ring rigidly affixed to the die body, the die ring clamp ring having a pair of arms affixed thereto, the arms affixed to the die ring clamp ring extending generally parallel to the arms of the die ring to form two pairs of generally parallel arms, each of the arm pairs being connected with a cam, whereby on rotation of the cams, movement of the arm pairs relative to each member of the pair is along the longitudinal axis of the arms of the arm pair to position the die ring relative to the mandrel.

* * * * *